June 15, 1965  E. LIESER ETAL  3,188,935
CAMERA WITH AUTOMATIC DIAPHRAGM CONTROL
Filed Aug. 20, 1962

ERNST LIESER
EDWIN MUELLER
INVENTORS

BY R. Frank Smith

Lloyd F. Seebach
ATTORNEY & AGENT

United States Patent Office 3,188,935
Patented June 15, 1965

3,188,935
CAMERA WITH AUTOMATIC DIAPHRAGM CONTROL
Ernst Lieser, Stuttgart-Vaihingen, and Edwin Mueller, Stuttgart-Hedelfingen, Germany, assignors to Eastman Kodak Company, Rochester, N.Y., a corporation of New Jersey
Filed Aug. 20, 1962, Ser. No. 217,875
Claims priority, application Germany, Nov. 11, 1961, K 45,179
7 Claims. (Cl. 95—64)

The invention relates to cine cameras having an automatic exposure control system, and more particularly to an arrangement associated with the automatic exposure control system for controlling the size of the diaphragm opening when the camera is idle.

Cine cameras having an automatic exposure control are well known, as well as those in which the photocell responsive to scene light is arranged within the camera and the scene light is projected onto the photocell by means of the camera lens system. Such an exposure control system automatically varies the exposure time and/or the size of the diaphragm opening as the film is advanced intermittently past the exposure station. As the shutter rotates, the light beam directed to the photosensitive material is cyclically interrupted and, as a result, the current generated by the photocell fluctuates. Because of the inertia of the electric measuring device or galvanometer, this fluctuation of current does not transform itself into a periodical fluctuation of the meter pointer or the diaphragm opening. However, when the camera is in an idle condition the size of the diaphragm opening, as indicated by the meter or actually set by the automatic exposure control system, is larger (smaller $f$ sotp) than when the camera is in an operative condition. As a result, when the camera mechanism is released, the film that is exposed as the camera approaches its normal operating speed is over-exposed due to the slower movement of the film and the larger diaphragm aperture or opening.

In order to compensate for this difference, a resistance is arranged in the circuit of the photocell and electric measuring device which adjusts the diaphragm opening to a size such that the slower movement of the film in conjunction with a smaller diaphragm opening (larger $f$ stop) provides an optimum exposure of the film until the film reaches its normal speed. The resistance is arranged in the circuit in such a way as to be cut out of the photocell circuit when the camera release has been actuated by the operator. In this way, the first few frames of film are subjected to the control as a function of the adjusted diaphragm opening and the slower movement of the film. However, as soon as the film movement reaches its normal speed, the diaphragm opening is automatically adjusted to a size which is a function of the scene brightness.

The primary object of the invention, therefore, is to provide an automatic exposure control system in which the exposure of the film when the camera is first rendered operative, is a function of a predetermined diaphragm opening and the film speed as it approaches its normal operating speed.

Another object of the invention is to provide an automatic exposure control system in which the diaphragm opening, when the camera is idle, is controlled by means associated with the camera release means.

And still another object of the invention is to provide an automatic exposure control system in which the diaphragm opening is at least one "$f$" stop larger, when the camera is idle, than the "$f$" stop that would be established by the same scene light conditions when the camera is operative.

These and other objects and advantages of the invention will be apparent to those skilled in the art by the detailed description which follows.

Reference is now made to the accompanying drawing wherein like reference numerals designate like parts and wherein.

Figure 1:
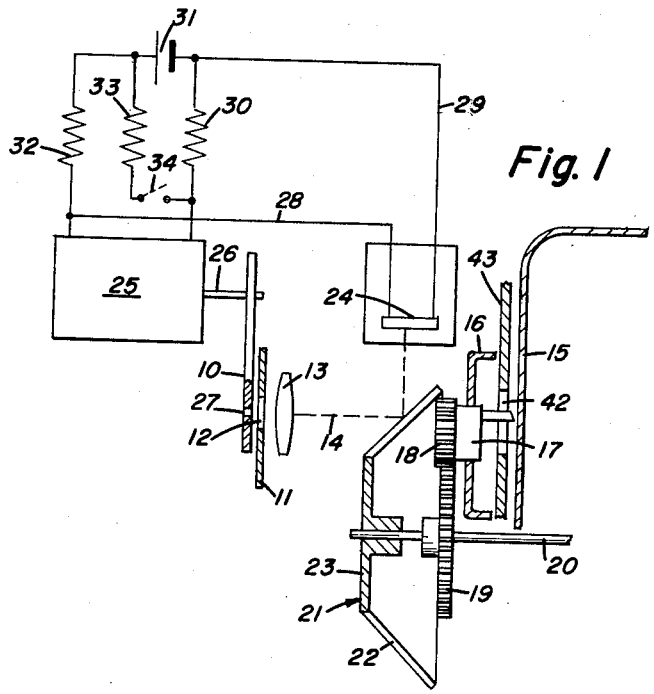
FIG. 1 is a schematic view of the elements of a camera showing the relation of the various elements for accomplishing the purpose of the invention.
Figure 2:
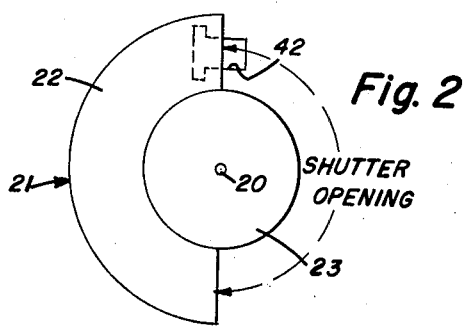
FIG. 2 is a detail elevation view showing the relation of the camera shutter to the exposure aperture.

The elements of the camera disclosed in FIG. 1 of the drawing can be readily incorporated in a camera as disclosed in U.S. Patent 2,494,038 in the name of Henry N. Fairbanks. In such a camera the diaphragm plate 10 is positioned in front of a plate 11 that is provided with an aperture 12 aligned with the lens element 13. The lens element 13 is fixed in its position relative to the optical axis 14 and forms part of the objective system for focusing the scene light on the photosensitive material or film 15. The film 15 is moved intermittently by means of a claw member 16 that is actuated by the eccentric 17 which is connected to the source of power for the camera in a well known manner, the source of power being an electric or spring motor, not shown. Gear 18, that is mounted in fixed relation to the eccentric 17, drives gear 19 fixed to the shaft 20 on which the shutter member 21 is also mounted. With reference to FIG. 1 it will be noted that shutter member 21 is arranged between the lens element 13 and the photosensitive material 15. As shown in FIG. 2, the shutter member 21 is provided with a truncated surface 22 which extends for substantially 180° of the periphery of the shutter. The shutter opening is therefore defined by the portion of the shutter member that does not have the truncated surface 22. The surface 22 is arranged at such an angle with respect to the face 23 so as to project the scene light from the lens element 13 to the photosensitive element or photocell 24. The surface 22 is highly polished or provided with a reflective material so as to cyclically direct the scene light to the photocell 24.

Figure 3:
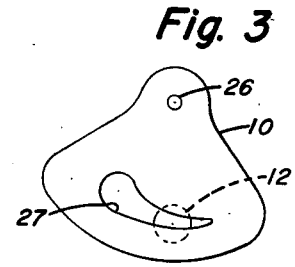
FIG. 3 is a detail elevation view showing the relation of the diaphragm plate to the entrance aperture for the camera lens system.

As is well known in the art, the photocell 24 can be connected to an electric measuring device 25 which can be in the form of a galvanometer having a movable coil that is rotated as a function of scene brightness. The axis or shaft 26 of the coil supports the single diaphragm plate 10 for movement relative to the aperture 12 in plate 11. The opening 27 in the diaphragm plate 10 provides a variable size opening in combination with opening 12, as shown in FIG. 3, and the movement of plate 10 can be calibrated for the "$f$" stop numbers which correspond, as is well known, to exposure openings of various sizes.

Photocell 24 is connected to the measuring device 25 by leads 28 and 29, the resistor 30 being in series with the photocell 24 in lead 29. Battery 31 and resistor 32 are connected in series circuit and in series across the leads 28 and 29. The resistor 33 is in series circuit with switch 34 and are connected in parallel with resistor 30 and battery 31.

Figure 4:
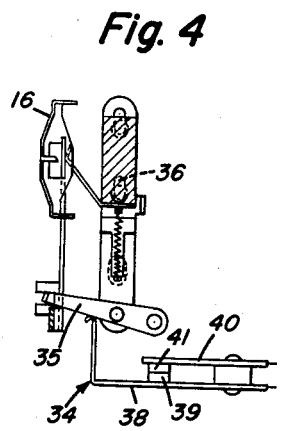
FIG. 4 is a detail elevation view of a camera release mechanism showing the switch means associated therewith for establishing the smaller diaphragm opening when the camera is idle.

The manually operable means comprises an arm or lever 35 which is actuated by means of a button 36 on the outside of the camera casing as disclosed in the above-mentioned U.S. patent. The lever 35 controls the mechanism that holds the camera in an idle or inoperative position. As shown in FIG. 4, when button 36 is depressed, the lever 35 is moved in a counter-clockwise direction and actuates the switch 34 to an open position, the switch 34 comprising an arm 38 having a contact 39 and an arm 40 having a contact 41. Upon movement of button 36, the contacts 39 and 41 are separated and the resistor 33 is removed from the circuit described above. Under these conditions, that is, when the camera is in an operative condition, the light transmitted through the aperture formed by opening 27 in plate 10 and the aperture 12 in plate 11 in directed by the reflective surface 22 of shutter 21 to the photocell 24. The scene light incident on photocell 24 causes the shaft 26 of measuring device 25 to be rotated through an angle thereby moving plate 10 and varying the size of the diaphragm opening as a function of scene brightness. As is well known, the light transmitted by the diaphragm opening will be transmitted cyclically by the open section of shutter 21 to expose successive frames of film through aperture 42 in the wall 43.

When the button 36 is released, the contacts 39 and 41 return to a closed position, thereby connecting resistor 33 across the resistor 30 and battery 31. Under these conditions, the light incident on photocell 24 will generate an output to the measuring device 25 which will be greater than that generated when resistor 33 is removed from the circuit and diaphragm plate 10 will, therefore, be moved through a larger angle in the proper direction to provide a larger "f" stop opening (that is, smaller dimension-wise). The shutter 21 will, of course, come to a stop when button 36 is released, which will place the opaque and reflective portion 22 of the shutter in position relative to the exposure aperture 42 for the film 15, thereby blocking the transmission of light thereto.

When the camera is pointed at the scene and viewed through the finder by the operator, the button 36 having not yet been depressed, the scene light is directed to photocell 24 by surface 22. Depending on the intensity of the scene light, the diaphragm opening may be changed or remain the same. However, due to resistor 33 being still in the circuit, the sensitivity of measuring device 25 is affected thereby and the actual diaphragm opening is at least one "f" stop larger than that determined by the actual light condition. When button 36 is depressed, resistor 33 is dropped out of the circuit and the drive mechanism is released for advancing the film and rotating the shutter. After release, an interval of time is required for the film and the shutter to reach their normal operating speeds. Also, since the scene light incident on the photocell 24 is now cyclically interrupted by shutter 21, an interval of time is also required for measuring device 25 to alter or change the diaphragm opening so as to establish it as a function of scene brightness. During this interval, the exposure of the film is determined by the larger "f" stop opening and the increasing film speed, and at the time the film is being moved at its normal speed, the sensitivity of the measuring device 25 has also reverted to normal, the diaphragm opening then being varied as a function of scene brightness.

Various other modifications and changes in the invention will be obvious to those skilled in the art. However, the invention is not to be limited to the embodiment disclosed and described herein, but is of a scope as defined by the appended claims.

We claim:

1. In a camera having an automatic exposure control system for regulating the exposure of film in said camera, said control system comprising an electric measuring instrument, a photocell energizable by scene light for energizing said measuring instrument, and a movable diaphragm member responsive to energization of said measuring instrument for establishing an exposure opening as a function of scene brightness, the combination comprising:

means for transmitting scene light from the exterior of said camera through a predetermined path to said film;

a rotatable shutter member having respective cut-out and opaque portions disposed for sequential cyclic movement across said path for cyclically interrupting said light when said camera is operating, said opaque portion being positioned in said path when said camera is idle;

means disposed on the opaque portion of said shutter member for directing said scene light to said photocell when it is in said path;

manually operable means movable between an initial position in which it maintains said camera idle and a release position in which it operates said camera; and means responsive to movement of said manually operable means into its initial position for varying the sensitivity of said measuring instrument so that the exposure opening established by said diaphragm member is smaller than the exposure opening that would be established by the same scene light conditions when said camera is operating.

2. A camera in accordance with claim 1 wherein said cut-out portion and said opaque portion comprise substantially equal portions of said shutter member.

3. A camera in accordance with claim 1 wherein said means responsive to said manually operable means comprises a switch actuated to a closed position by said manually operable means for inserting a resistor in series circuit with said switch in the circuit for said measuring device to change the sensitivity thereof.

4. A camera in accordance with claim 1 wherein said means disposed on said opaque portion comprises a reflective surface on said shutter member.

5. A camera in accordance with claim 1 wherein the smaller exposure opening is at least one "f" stop larger than the "f" stop opening that would be established by the same scene light conditions when said camera is operating.

6. In a camera having an automatic exposure control system for regulating the exposure of film in said camera, said control system comprising an electric measuring instrument, a photocell energizable by scene light for energizing said measuring instrument, and a movable diaphragm member responsive to energization of said measuring device for establishing an exposure opening as a function of scene brightness; the combination comprising:

means for transmitting scene light from the exterior of said camera through a predetermined path to said film;

a rotatable shutter member having respective cut-out and opaque portions disposed for cyclically interrupting said scene light when said camera is operating; said opaque portion being angularly equal to said cut-out portion and having a reflecting surface for directing said light to said photocell, said reflecting surface being positioned in said path when said camera is idle;

manually operable means movable between an initial position in which it maintains said camera idle and a release position in which it operates said camera; and circuit means including a normally open switch and a resistor in series circuit, said switch means being held in a closed position by said manually movable means when it is in said initial position for inserting said resistor in the circuit for said measuring instrument to vary the sensitivity thereof, so that the exposure opening established by said diaphragm member is smaller than the exposure opening that would be established by the same scene light conditions when said camera is operating.

7. A camera in accordance with claim 6 wherein the smaller exposure opening is at least one "$f$" stop larger than the "$f$" stop opening that would be established by the same scene light conditions when said camera is operating.

References Cited by the Examiner

UNITED STATES PATENTS

| 1,934,484 | 11/33 | Camilli | 95—10 X |
| 2,061,909 | 11/36 | Karg | 95—64 |
| 3,099,193 | 7/63 | Freudenschuss | 95—10 |

FOREIGN PATENTS 1,096,191  12/60  Germany.

NORTON ANSHER, Primary Examiner.

EMIL G. ANDERSEN, Examiner.